(12) United States Patent
    Gaulard et al.

(10) Patent No.: US 8,503,870 B2
(45) Date of Patent: Aug. 6, 2013

(54) METHOD AND DEVICE FOR SUPPLYING HOT WATER

(75) Inventors: Hervé Gaulard, Courtefontaine (FR); Thierry Gourand, Orchamps (FR)

(73) Assignee: SEB SA, Ecully (FR)

( * ) Notice: Subject to any disclaimer, the term of this patent is extended or adjusted under 35 U.S.C. 154(b) by 1179 days.

(21) Appl. No.: 11/719,275

(22) PCT Filed: Nov. 14, 2005

(86) PCT No.: PCT/FR2005/002820
    § 371 (c)(1),
    (2), (4) Date: Feb. 3, 2010

(87) PCT Pub. No.: WO2006/051226
    PCT Pub. Date: May 18, 2006

(65) Prior Publication Data
    US 2010/0221394 A1    Sep. 2, 2010

(30) Foreign Application Priority Data
    Nov. 15, 2004  (FR) ...................................... 04 12101

(51) Int. Cl.
    *F24H 1/10*    (2006.01)
(52) U.S. Cl.
    USPC ............................ 392/466; 392/465; 392/471
(58) Field of Classification Search
    None
    See application file for complete search history.

(56) References Cited

U.S. PATENT DOCUMENTS

| 4,286,140 A | 8/1981 | Dewulf et al. |
| 6,000,317 A | 12/1999 | Van Der Meer et al. |
| 2002/0051632 A1 | 5/2002 | Kodden et al. |
| 2004/0011814 A1* | 1/2004 | Andrews .................... 222/129.1 |

FOREIGN PATENT DOCUMENTS

| DE | 197 32 414 | 2/1999 |
| EP | 1 408 291 | 4/1997 |
| GB | 2 305 233 | 4/1997 |
| GB | 2 324 014 | 10/1998 |
| GB | 2 394 215 | 4/2004 |
| RU | 2134987 | 8/1999 |

OTHER PUBLICATIONS

FR Preliminary Search Report, Jun. 28, 2005.
Int'l. Search Report, Feb. 21, 2006.

* cited by examiner

*Primary Examiner* — Thor Campbell
(74) *Attorney, Agent, or Firm* — Law Offices of Robert F. Zielinski

(57) ABSTRACT

The invention relates to a method for preparing drinks by supplying hot water for a hot drinks dispenser by means of a liquid transport circuit (2) comprising a heating element (8) provided with a heating resistance, and a pump (14). According to the invention, once a control means (7) has been actuated by a user, a liquid is heated by feeding the heating resistance at a pre-defined average electrical power, the heating of the liquid is maintained, and as soon as the measured temperature is higher than a first pre-determined temperature threshold, the liquid is circulated in the heating element (8), at a constant nominal rate of between 0.5 and 1.5 cl/second, and the average electrical power of the heating resistance (12) is such that the ratio of said power expressed in Watts divided by the nominal rate in centiliters per second is higher than 2000.

25 Claims, 5 Drawing Sheets

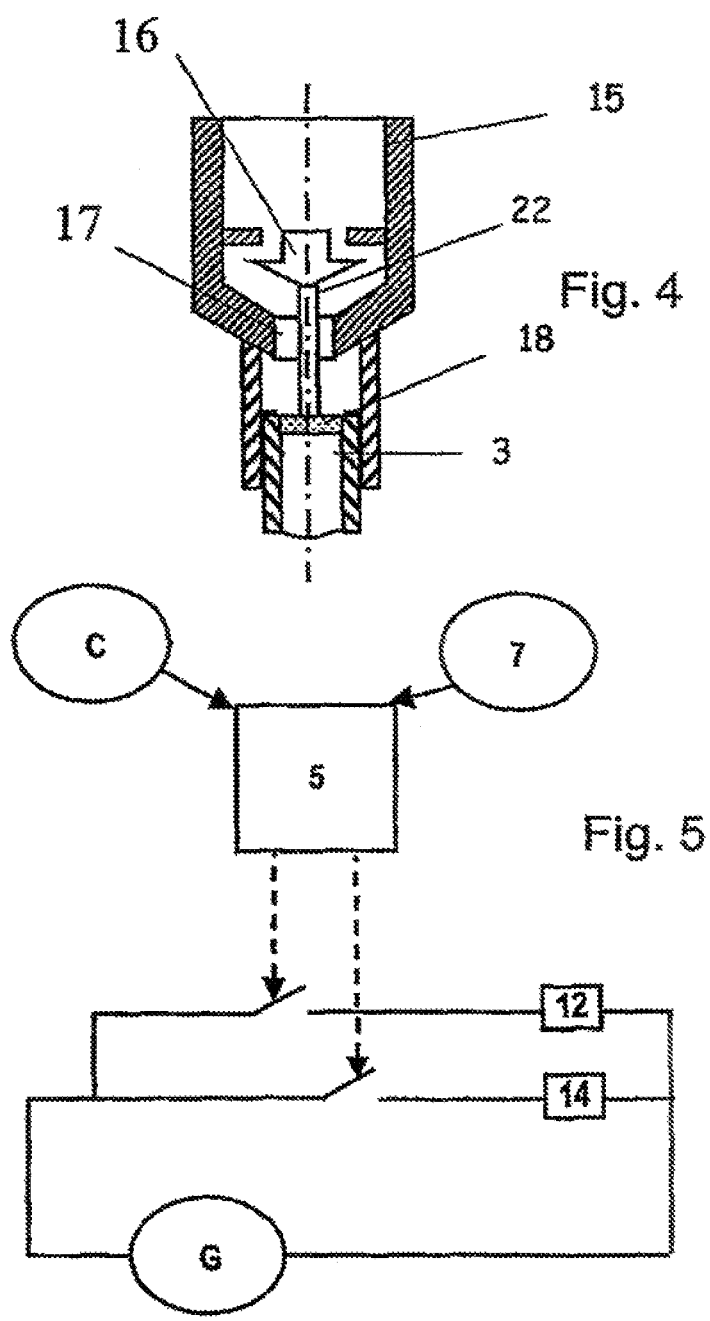

METHOD AND DEVICE FOR SUPPLYING HOT WATER

This Application claims priority to PCT Application No. PCT/FR2005/002820, filed on Nov. 14, 2005, which in turn claims priority to French Patent Application No. 04 12101, filed on Nov. 14, 2004.

This invention relates in general to a method and device for supplying hot drinking water.

Devices are known capable of providing small quantities of very hot water (unlike water heaters that provide large quantities of fairly hot water), namely one to two litres maximum such as hot drink dispensers, coffee machines or kettles.

For example, patent document GB 2 394 215 A discloses a drink preparation device by the supply of hot water comprising:
 a liquid transport circuit;
 an electronic control unit provided with an electrical power supply source and a control means for the device;
 the transport circuit comprising:
  a liquid heating element including a heating resistance and arranged in series with a pump adapted to circulate liquid in the circuit at a given flow, the pump and the heating element being electrically powered and controlled independently of each other by the control unit.

This device according to prior art includes a storage reservoir for liquid permanently heated by the heating element to a temperature of between 50 and 60° C. As soon as the user controls a quantity of hot water, the heating element is then electrically boosted to heat water already preheated by the device up to a temperature that can reach boiling temperature, and then the pump is actuated to produce water at a temperature of more than 60°.

Such a device can quickly produce hot water but it has the disadvantage that it continuously consumes energy necessary for preheating.

The main disadvantage for kettles is the time during which the device heats water, giving the user the impression that the device is inactive. Another disadvantage is that the user tends to heat more water than is necessary, which causes a loss of time and energy.

In the case of hot drink dispensers or "expresso" type coffee machines, a water quantity or an aluminium mass is kept continuously hot. This leads to unnecessary energy consumption.

Furthermore, the waiting time before the hot liquid starts to be delivered is relatively long and is usually more than 5 seconds, thus extending the time necessary to obtain the drink.

A coffee machine of the type mentioned above that eliminates the need to preheat a large quantity of water is disclosed in patent document U.S. Pat. No. 6,000,317. This machine includes a filter containing coffee located at the output from the water transport circuit. To operate, water is heated very quickly (for example to reach the coffee percolation temperature from 92° C. to 96° C., but possibly beyond 100° C. due to the back pressure created by the coffee) at high pressure, and is transported to the filter at a flow that depends on the pump and reduces as the pressure loss due to the coffee located in the filter increases. Thus, this machine cannot produce hot water (temperature above 70° C. and preferably below 90° C.) at a constant high flow, for example more than 0.5 centilitres per second.

The problem that arises is then to be able to provide hot water using a method and a device capable of fairly quickly producing a quantity of hot but not boiling water (70° C. minimum and preferably below 90° C.), at least sufficient to fill a receptacle such as a cup (from 12 to 40 cl) so as to make a drink preparation such as tea without preheating the device, and/or a volume of water, and without needing a very high heating power.

The expression "preheating" means any previous heating operation before the user controls the device, and a very high power should be considered as exceeding 3.5 kW, without going beyond this value, which would cause problems in the domestic electrics network normally used to supply power to small household appliances.

The expression "fairly quickly producing" means firstly starting to produce the required flow of hot liquid within less than 5 seconds after the user activates the device control, and secondly to produce a liquid volume equal to at least 12 centilitres at 70° C. in less than 25 seconds.

Note that throughout the description of the invention, the abbreviation "cl" denotes a centilitre that is equal to $10^{-2}$ cubic decimetres (ten to the power of minus two cubic decimetres).

To achieve this, the method according to the invention for preparation of a drink by supplying hot water through a liquid transport circuit comprising a heating element comprising a heating resistance and a pump arranged in series with the heating element and adapted to circulate water in the circuit, is such that after a user actuates a control means:
 the liquid is heated by supplying a predefined average electrical power to the heating resistance, and the temperature (T) of the heated liquid is measured,
 the liquid is kept heated and as soon as the measured temperature (T) is greater than a first predetermined temperature threshold (T1), the liquid for the drink is circulated in said heating element with a given constant nominal flow (D) less than 2 cl/second and preferably between 0.5 and 1.5 cl/second and the average electrical power of the heating resistance being such that the ratio (R) of this power expressed in Watts divided by the constant nominal flow expressed in centilitres per second is more than 2000.

Preferably, this ratio (R) between said predefined average electrical power and the given constant nominal flow is equal to a constant predefined value between 2000 and 4000.

Therefore with this method, it is possible to satisfy the problem that arises by quickly delivering a given quantity of hot liquid at more than 70° C. without needing a continuous preheating of liquid to be delivered.

Due to the above ratio, the heating method according to the invention can be used by supplying power to the device through the mains power supply available on domestic public networks throughout the world (for example 16 amperes on the European 220 V network, and the American 110 V network).

Thus, the average electrical power of the heating resistance used to implement the method and the device according to the invention is chosen to be less than 3500 W, this value being measurable when the resistance is electrically powered from the previously mentioned domestic public network.

According to the invention, the pump and the heating element are controlled independently of each other, by an electrical control unit provided with an electrical power supply source and a control means, the method being triggered simply by the user applying an initial control on the control means and when the electronic control unit receives the control, it manages the set of actions of the method.

Thus, liquid heating is not triggered until the user has acted on the control means, and then circulation of the heated liquid at a given fixed flow does not begin until after the liquid temperature has reached the first temperature threshold.

It would also be possible to organise the layout such that the heating resistance power supply is switched off as soon as the measured temperature T is greater than the second threshold T2, while maintaining the liquid circulation and cutting off the fluid circulation when the required quantity of liquid has been supplied to the user. This means that the heated liquid can be delivered continuously, without the liquid going above its vaporisation temperature. The delivered liquid is poured into a receptacle, preferably a cup.

The invention also includes a device for a drink preparation by supplying hot water including a heating device like that described above, and according to which the pump and the heating element are such that the electrical ratio (R) of the average electrical power (P) of the heating resistance expressed in Watts, divided by the nominal flow of the liquid (D) that the transport circuit pump is capable to output/deliver and expressed in cl/s, is greater than 2000.

This device also solves the problem that arises so that the method according to the invention can be used.

It may also include a particular heating element enabling fast heating of a liquid volume due to a heating resistance silk-screen printed directly onto one face of the complementary element. The thermal power produced by the silk-screen printed resistance is transmitted directly through the complementary element to the liquid located in the heating element, between the body and the complementary element.

Advantageously, it can be arranged such that after the power supply to the heating resistance is switched off while maintaining the liquid circulation, the control method switches the heating resistance on again as soon as the measured temperature passes below a third temperature threshold lower than the second threshold and higher than the first threshold, and the cycle in which the power supply to the heating resistance is switched off and on begins once again until the user has been provided with the required quantity of liquid, depending on the case.

This characteristic means that hot water can be output continuously at a given flow, in other words at a constant fixed flow until the required quantity of liquid has been obtained. This flow is preferably less than 2 cl/second and is preferably between 0.5 and 1.5 cl/second.

Furthermore, so that the user is not surprised that no liquid is output after his control (see above waiting time of less than 5 seconds) before the liquid temperature T has reached the first temperature threshold T1, liquid for his drink is circulated in the heating device at a low minimum flow (Dmin) lower than the nominal flow D.

The particular design of the pump and the resistance according to the invention are such that when they are switched on, the heating power is always sufficient to heat the liquid circulating at a constant flow to above the first temperature threshold. Therefore, there is no need to cut off the flow to avoid outputting liquid (water) at a temperature below the first temperature threshold.

This enables an uninterrupted flow so that hot water is always available above the second temperature threshold.

Thus, after heating part of the liquid to above the first threshold temperature, there is no doubt that as long as the transport circuit is supplied with liquid at the given flow and as long as the resistance power supply is switched on, then the liquid output from the device is heated to reach at least the second temperature threshold (usually greater than 70° C.).

Due to this characteristic, the device according to the invention can be used to dispense a heated liquid quickly, this distribution only being interrupted under the control of the user using the control means or by programming the required quantity.

Since the heating power and the fixed flow are capable of reaching the predefined ratio of 2000, the result is that there is no need to control the resistance in proportional mode.

Thus, the heating resistance is controlled digitally by the control unit, which is particularly economic compared with a proportional regulation solution.

Advantageously, the device comprises a temperature sensor connected to the control unit and arranged to pick up a temperature on a portion of circuit located between the heating element and the free end. It should be noted that "located between the heating element and the free end" means that the sensor can be positioned on the heating element and also on the output side of the heating element, between this element and the free end.

This temperature sensor is preferably a thermistor with a Negative Temperature Coefficient (NTC), but it could also be a thermistor with a Positive Temperature Coefficient (PTC).

Other characteristics and advantages of the invention will become clear after reading the description given below for guidance and that is in no way limitative, with reference to the appended drawings in which:

FIG. 4 shows a sectional view of an example of a closing valve of the device according to the invention;

FIG. 5 shows a diagrammatic view of the control circuit of the device according to the invention;

As stated above, the invention relates to a device for supplying hot liquid, this liquid usually being water previously brought to an ambient temperature of about 20° C. to 25° C. (conditions for which the device is particularly suitable).

Figure 1:
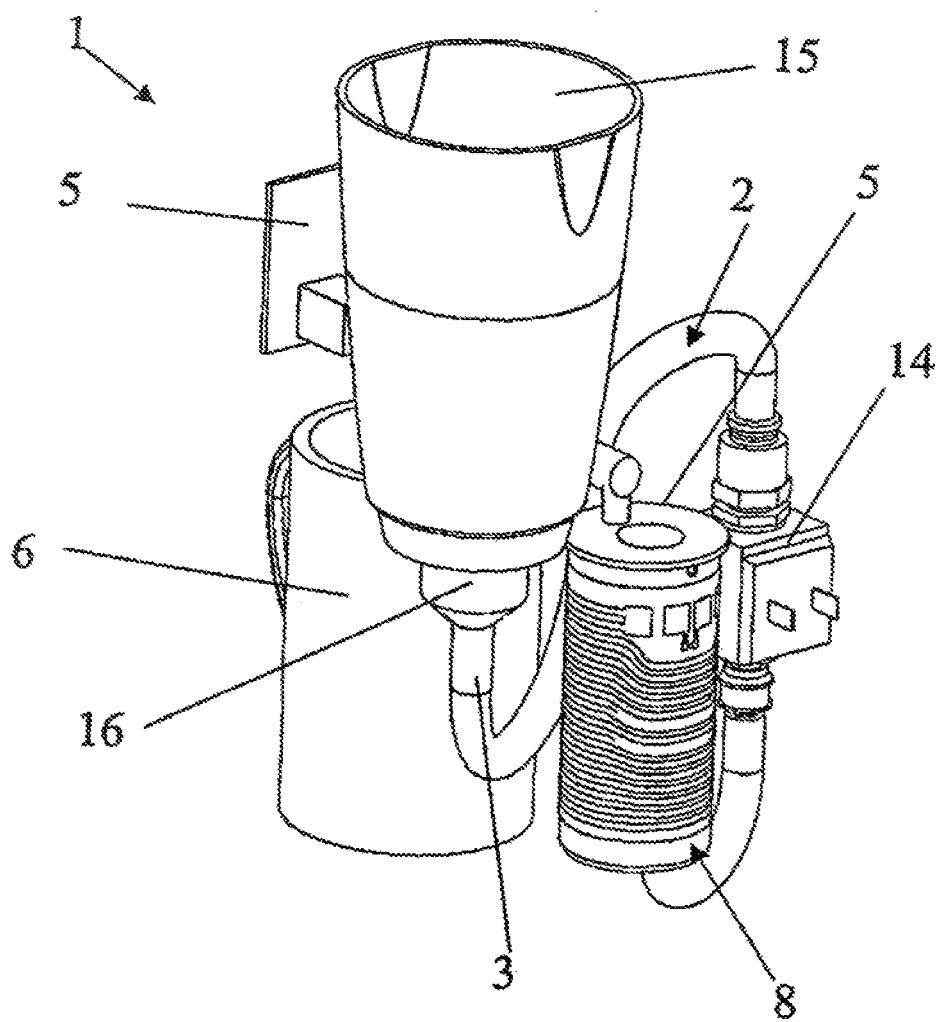
FIG. 1 shows a front perspective view of a liquid heating device according to one embodiment of the invention.
Figure 2:
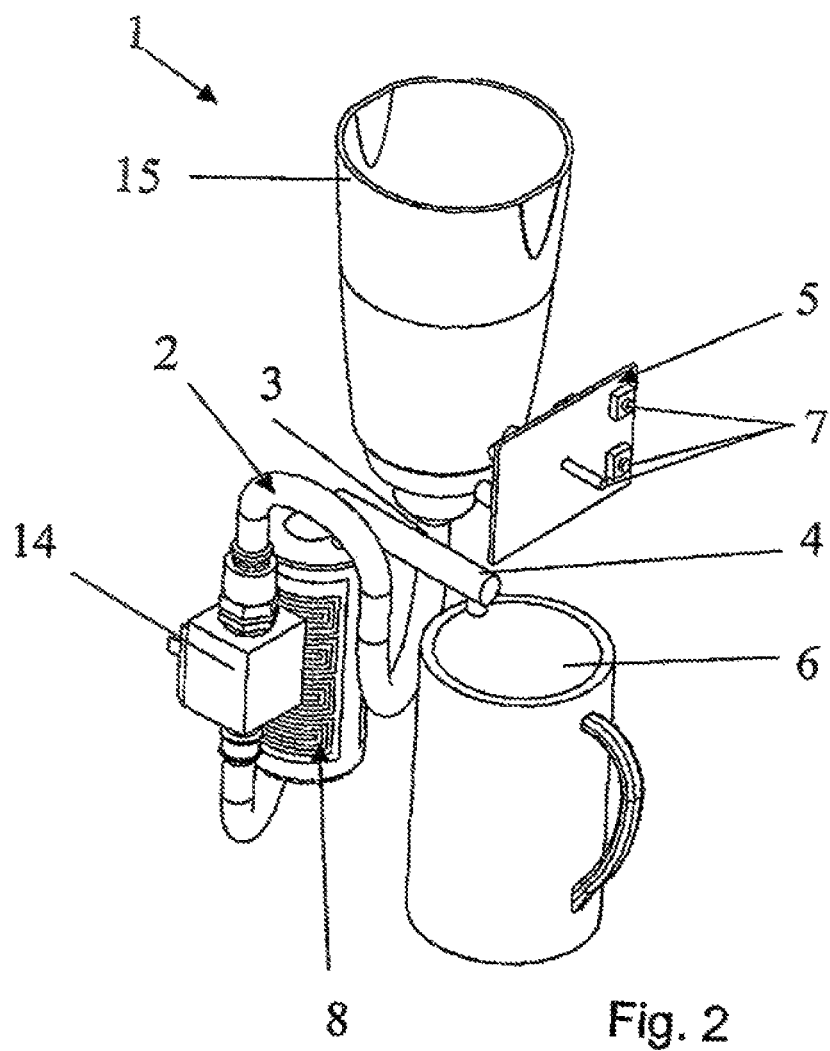
FIG. 2 shows a back perspective view of the device in FIG. 1.

The hot liquid supply device 1 shown in FIGS. 1 and 2 includes a liquid transport circuit 2 and an electronic control unit capable of collecting user controls, operating information for the device and for controlling the device. Thus, the control unit manages use of the method according to the invention.

Given that the device according to the invention is used to prepare drinks by the supply of hot water, parts of the transport circuit 2 that are in contact with the heated liquid, in other words hot water, are made of food quality material(s) such as stainless steel or plastic (for example PA with glass filler). Water heated and circulated according to the method described in the invention is output into a receptacle such as a cup, and can be drunk by the user.

The transport circuit 2 has a liquid supply end 3 connected to a liquid reservoir 15 through a closing valve (described in FIG. 4) and another free end 4 to output heated liquid to a user.

Due to its reservoir, the device according to the invention can operate without having to be connected to an external water supply network.

A cup is shown below the free end 4 of the transport circuit 2 to contain heated and output liquid.

The circuit also includes a liquid heating element 8 arranged in series with a pump 14 on the output side of this pump.

This pump 14 is adapted to circulate liquid in the circuit 2 at a given fixed flow D, in other words at a constant flow. The position of the pump 14 between the reservoir 15 and the heating element 8 can be used to supply the pump with water at a moderate temperature that extends its life. Furthermore, due to this position, the liquid located in the heating element is always slightly pressurised because it is on the output side of the pump. This slight pressurisation means that a heating temperature close to the boiling point can be reached for a short period without the risk of massive formation of steam in the circuit.

The control unit is electrically powered by a power supply cable not shown, and connected to the mains power supply. As can be seen in FIG. 5, this unit includes an electronic circuit connected to a temperature sensor C arranged on the heating element, close to the heated liquid output (in other words on the output side of the heating resistance 12 of the heating element 8).

Figure 3:
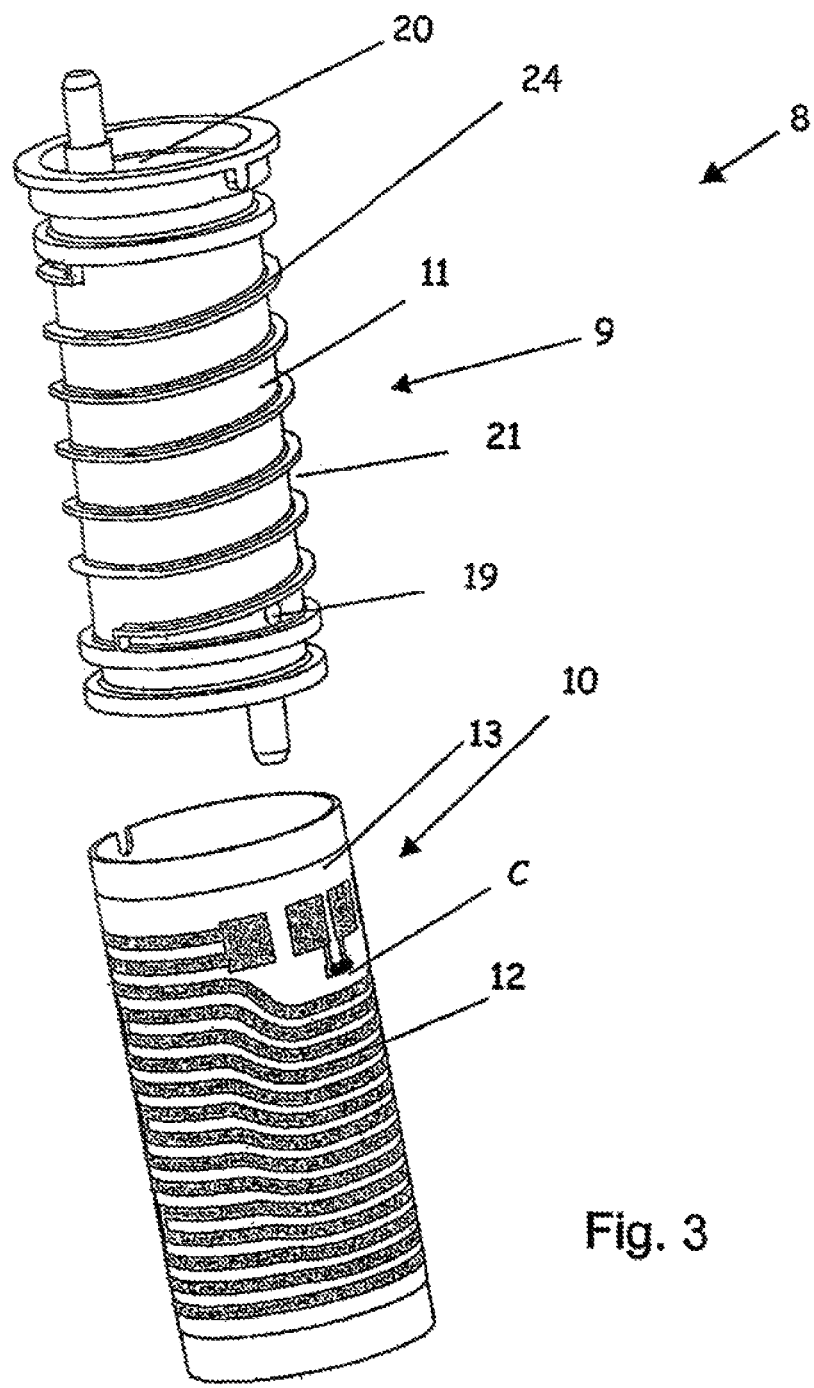
FIG. 3 shows an exploded perspective view of the heating element of the device according to the invention.

The heating element 8 shown in FIG. 3 includes a main body 9 associated with a complementary element 10 covering one face of the main body 9 to define a liquid circulation volume, said complementary element 10 having a silk-screen printed heating resistance 12 on its face 13 opposite the face facing the main body 9.

The thermal inertia of the main body 9 is less than the thermal inertia of aluminium and the complementary element has a silk-screen printed heating resistance on its face 13 opposite the face facing the main body.

The thermal inertia (Ith) is the capacity of a body to store more or less heat, that can be expressed as the product of the value of its density ($\rho$) and the value of its specific heat (cp).

$$Ith = \rho \times cp$$

According to the invention, the main body is a sort of "thermal insulation" characterized in that during a heating phase, it absorbs fewer calories than the circulating liquid due to its low thermal inertia.

To achieve this, this main body 9 is made of plastic.

Advantageously, the complementary element has a high coefficient of transverse thermal conduction, for example more than 40. A coefficient of transverse thermal conduction (Cth) means the ratio of the value of the coefficient of thermal conductivity ($\lambda$) of the material in the heating complementary element divided by the value of its thickness (e) expressed in millimetres.

$$Cth = \lambda/e$$

In other words, the complementary element very quickly transmits the calorific energy from the heating resistance to the liquid by conduction, because either the thickness of the complementary element is small (of the order of 3 mm for a material such as aluminium with a high conductivity coefficient) or the thickness is very small (of the order of one millimetre) for a material with, a low coefficient of conductivity such as stainless steel.

Incidentally, the fact that the heating resistance is of the silk-screen printed type in combination with a good coefficient of transverse thermal conduction means that the complementary heating element also has a low thermal inertia, reducing energy losses. This type of heating element 8 with a silk-screen printed heating resistance 12 can achieve uniform heating over a large area in contact with the liquid, which increases its general thermal conductivity efficiency.

In other words, the heating element 8 comprises a main body 9 that is relatively thermally insulating, and that is covered by a complementary element 10 that warms up quickly. Therefore this complementary element 10 transmits calorific energy to the liquid circulating in the space that separates its from the main body 9. Due to the high coefficient of heat transfer by conduction of the complementary element, the majority of the energy dissipated from the silk-screen printed resistance is transmitted to the circulating liquid rather than accumulating in the complementary heating element 10. Similarly, the main heating body 9 has a low thermal inertia, such that it stores a small quantity of energy from the complementary heating element 10.

It follows that the liquid very quickly and almost entirely receives heat energy from the silk-screen printed resistance 12, such that the liquid is heated almost instantaneously. Similarly, the main body practically does not participate in liquid heating phenomena, such that when the device is not operating, there is no need to supply a quantity of energy so that it remains at a sufficiently high temperature.

In other words, consumption of the heating device outside the heating phases themselves is zero. Consequently, the heating phase of the heating element 8 is extremely fast when the device is first being used, because the heating body does not need to receive a large quantity of energy to reach the working temperature. Therefore there is no need for a warming up phase before the user actuates the control means 7 that consists of an on/off button.

In practice, the heating element 8 may have different geometries. Thus, in the first embodiment shown in FIG. 3, the central body is cylindrical and the complementary heating element 10 forming an annular sleeve fits on its outside face 11.

In another embodiment, the central body may be flat and then receive a heating element that is also flat.

As shown in FIG. 3, the device could be made more efficient if the main body 9 is provided with a groove so that it can define a liquid circulation channel with the complementary element 10, thus extending the path followed by the liquid within the heating device, and therefore its ability to receive heat energy.

For the same reason, the silk-screen printed resistance 12 may advantageously be located vertically in line with the liquid circulation channel.

In practice, the groove is helical 21 as shown in FIG. 3 when the heating element is generally cylindrical in shape, while the groove may be in the form of a spiral when the central heating body is flat. The helical groove 21 is formed by a spiral 24 winding along the face 11 of the body 9.

In the same way, the main heating body 9 is preferably hollow so as to limit its mass and therefore its thermal inertia.

The temperature sensor C is arranged on the complementary element.

Since the complementary element 10 has a high transverse conductivity and the main body 9 and the complementary element 10 have a low thermal inertia, the electrical and/or electronic control is particularly dynamic and practically instantaneous, such that the liquid is output at a fairly stable temperature with a minimum energy consumption.

FIG. 3 shows an embodiment of the heating element 8 in which this heating element is cylindrical.

In this case, the heating element 8 includes a central main body 9 associated with a complementary heating element 10 in the form of a cylindrical sleeve. The space defined between the outside face 11 of the central main body 9 and the inside face of the sleeve 10, forms the hollow cylindrical volume through which liquid circulates.

In the embodiment shown, the outside face of the main body 9 comprises a helical groove 4 that cooperates with the sleeve to define a liquid path around the main body. However, in other embodiments not shown, the outside face of the main body 9 may be fully cylindrical, cooperating with the sleeve to define a circulation volume with constant thickness, extending along the cylinder. Other variants could be envisaged without going outside the framework of the invention. In practice, the central main body 9 is connected to a cold water supply, in other words to the pump water outlet. This inlet is connected to the outside face (face 11 of the main body) through a practically radial channel 19 that opens up on the outside face 11.

The central main body 9 is preferably made from a plastic material, or more generally from a material with a low thermal inertia Ith, in any case less than the inertia of the aluminium by the order of 2.30, so that only a small amount of the heating energy is stored. Some materials that could be suitable for making the main body 9 according to the invention include polyamide (Ith=1.9), polyacetal (Ith=2), polypropylene (Ith=1.6), polysulfone (Ith=1.4) or polycarbonate (Ith=1.5) and polyphenine sulfone PPS.

In the embodiment shown in FIG. 3, it can be seen that the central main heating body 9 comprises a central recess 20, that will even further reduce its weight and therefore its thermal inertia.

In this example, the depth of the groove 21 is of the order of 3 millimetres and its width is about 8 millimetres. This groove 21 is helical in geometry, with a pitch of about 9 millimetres. In other words, the depth is less than the width such that liquid is "spread" in contact with the complementary heating element 10, thus facilitating transfer of heat.

Preferably, the sleeve or complementary element 10 is made so as to have a high coefficient of transverse thermal conduction and a low thermal inertia.

The thickness of the sleeve 10 is minimised as a function of the basic material to reduce this thermal inertia and to increase conduction phenomena. Materials that give good results in terms of thermal properties include copper, stainless steel, aluminium and glass. Note that the sleeve 10 allows deposition of a silk-screen printed electrical heating resistance 12.

The method for making the heating tracks consists of silk-screen printing one or several layers of insulating material, then a layer of a conducting paste along a particular path to form contact pads, and finally one or several layers of insulating material. The available power may be of the order of 2000 W to 3000 W.

Therefore, this electrical resistance 12 forms a ribbon that, in the embodiment shown, is arranged in the form of transverse circles, with an offset along the same longitudinal line; the entire internal surface of the sleeve forms a heating plate, in contact with which the grooves force the liquid to flow. If required, the silk-screen printed resistance may be helical and may be vertically in line with the channels defined by the groove 21 of the main heating body 9. In this case, the heating efficiency and speed are improved.

Thus, for a stainless steel sleeve/complementary element 10 with an outside diameter of the order of 45 mm, the thickness of the sleeve 10 may advantageously be between 0.5 and 1.5 millimetres, preferably between 0.8 and 1 millimetre. Its coefficient of transverse thermal conduction Cth is then of the order of 60. The advantage of stainless steel is its resistance to corrosion and its resistance to high temperature, facilitating the production of flat heating elements.

The use of an aluminium sleeve/complementary element 10 could be considered, but with heating elements on a polyimide support and pastes with a lower baking temperature. For example, the coefficient of thermal conduction Cth of an approximately 3 millimetres thick aluminium sleeve for making silk-screen printed heating elements is of the order of 70.

In practice, water circulation in the path along the outside face 11 of the main body 9 is controlled by the pump, but this circulation could also be made without a pump, by gravity, however the pump has the advantage of providing a constant flow.

A temperature sensor C such as an NTC resistance is added in contact with the complementary heating element and is connected to the electronic control unit 5 in FIG. 5.

When first switched on and when the heating device is cold, the regulation controls fast warming up lasting for the order of 2 to 3 seconds, before starting water circulation. This preheating is particularly fast and is almost imperceptible to the user, and is the result of the low global thermal inertia of the device and its thermal transfer efficiency essentially to water contained in the circuit.

In practice, measurements made with this type of heating device (equipped with an electrical heating resistance with a power of 2 600 watts) can be used to heat about 21 centilitres of water to a temperature of between 70 and 80° C. in only 25 seconds. The preheating phase is only optional and particularly short, since the flow starts not later than about three seconds after the heating device is switched on.

It is clear from the above that the heating element 8 of the device according to the invention has many advantages and particularly that it has an extremely low thermal inertia. Therefore, it follows that water circulating in the device warms up almost instantaneously as soon as the heating resistance 12 is switched on.

When the resistance 12 is switched off, the heating element cools quickly due to its low thermal inertia, thus avoiding heating the near environment and also facilitating regulation of the output temperature.

The presence of the silk-screen printed resistance also distributes the heating power over a larger surface area than existing solutions, so as to optimise the heat transfer.

FIG. 4 shows an example of a closing valve 16 installed on a lower portion of the reservoir. This valve 16 is installed free to slide in the lower portion of the reservoir such that in one position it closes the fluid passage 17 and in another position it closes off this same passage.

The connection between the reservoir and the liquid supply end is made by inserting a male tube into a female tube.

The valve includes a conical sealing portion and a rod 22 that bears in contact with a complementary portion of the supply end when the reservoir is assembled with the supply end.

When the reservoir 15 is assembled with the supply end 3, the rod 22 of the valve stops in contact with the supply end 3, thus forcing the valve to pass from its close position to its open position. Conversely, when the reservoir is separated from the supply end 3, the valve returns into its closed position by gravity and/or under the pressure of a spring acting on the valve, or under pressure of the liquid in the reservoir.

Thus, the closing valve 16 automatically opens the fluid passage 17 from the reservoir 15 to the pump 14 when the reservoir 15 connected to the supply end 3 and automatically closes this passage 17 when the reservoir 15 is disconnected from the supply end 3.

A filter 18 may be located at the input of the supply end so as to prevent polluting particles from entering the liquid transport circuit 2.

FIG. 5 shows a wiring diagram of the device according to the invention.

The electronic control unit 5 and/or the electrical control unit includes a control means 7 that is a start button, possibly coupled with a means of preselecting the liquid volume to be dispensed.

If the device according to the invention includes a means for preselecting the liquid volume to be dispensed, this means is preferably a manually adjustable timer managed by the control unit 5. Since the flow output by the pump of the device is fixed (constant), then the liquid volume actually dispensed depends only and directly on the operating time of the fixed flow pump.

For example, if the timer is set to 7 seconds, the pump will be powered for 7 seconds, so that it will dispense about 7 centilitres of hot water at constant flow.

The control unit is also connected to a temperature sensor C and two switches, one acting on the electrical power supply of the heating resistance 12 and the other acting on the electrical power supply of the pump 14.

In this way, the pump 14 and the heating element 8 are electrically powered and controlled independently of each other by the control unit 5.

A generator G (symbolising the mains electrical power supply) supplies electrical energy to the heating resistance 12 and the pump 14 to which it is connected.

The method of control of the device is triggered by a single initial control exerted by the user on the control means 7 of the device. The electronic control unit manages all actions included in the method, when this control is received.

Figure 6:
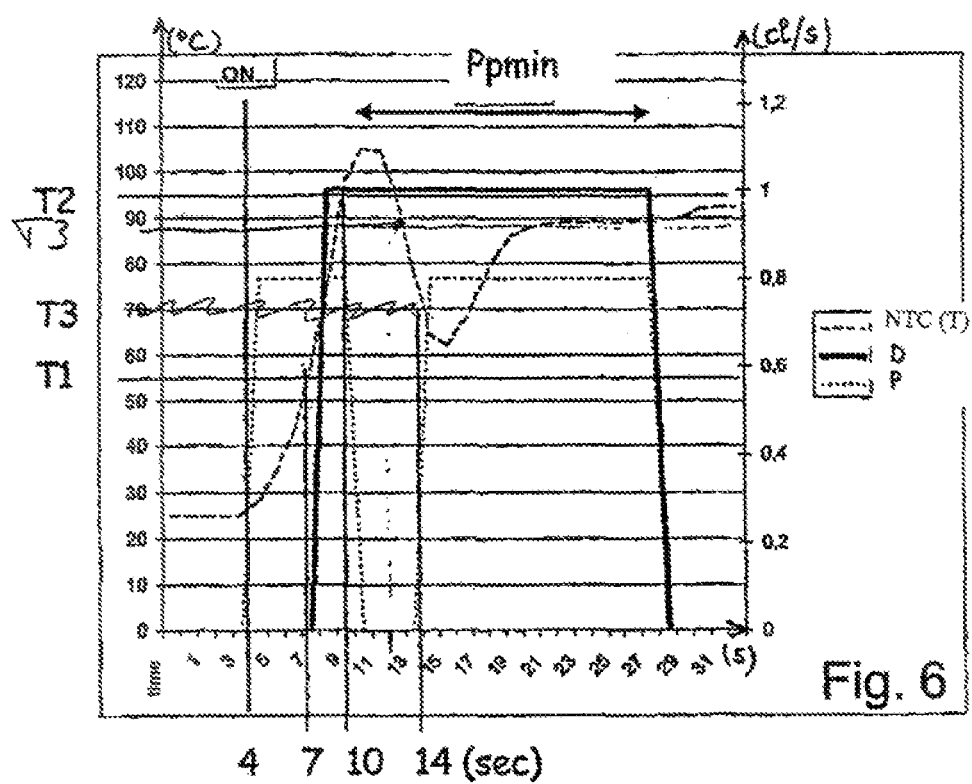
FIG. 6 shows a view of a heating cycle done according to the method in the invention and with the device according to the invention.

Operation of this circuit and management of heating and the flow through the electronic control unit is shown in FIG. 6.

FIG. 6 shows a heating cycle performed according to the method disclosed in the invention with the device according to the invention. The abscissa represents the time scale in seconds.

The left ordinates axis numbered from 0 to 120° C. corresponds to the temperature curve in degree Celsius indicated by the NTC over time. This curve is actually a curve representing the temperature of the liquid that passes through the heating element 8 as a function of time.

The curve D corresponds to an instantaneous liquid flow generated by the pump as a function of time. The numeric value corresponding to this curve D is shown on the right ordinates axis numbered from 0 to 1.2 centilitres per second. In this example operation, the fixed flow of the pump in operation is set to 1 centilitre per second.

The third curve P is the electrical power supply curve of the heating resistance 12 as a function of time. No electrical power unit is given for this curve. However, points on this curve facing 0 on the left ordinates axis indicate that the power supply to the resistance is not switched on. Conversely, points on this curve facing 78 on the left ordinates axis indicate that the resistance is powered with an electrical power supply of about 2600 watts.

The various measurements begin at time 0 second. In a first phase from 0 to 4 seconds, the measured liquid temperature is 25° C., which is the ambient temperature of the liquid to be heated.

At 4 seconds, the user takes action on the control means 7 to control start of the device (this instant is symbolised by the "ON" reference) and adjusts a 21 second "Tpmin" timeout corresponding to 21 centilitres of heated liquid.

At this time 4 seconds, the heating resistance 12 is powered at 2600 watts and the liquid temperature given by the "NTC (T)" curve quickly rises above 25° C.

From time 4 seconds to time 7 seconds, in other words during 3 seconds, the liquid temperature rose from 25° C. to 55° C.

Since the first temperature threshold T1 is set to 55° C., the electronic control unit that receives temperature control information then starts the pump at its nominal flow of 1 centilitre per second for a timeout "Tpmin" selected by the user. Liquid then circulates in the transport circuit for 21 seconds, in other words from time 7 seconds to time 28 seconds. It should be noted that in the control method according to the invention, the time "Tpmin" is used to define the time to start the operation of the pump starting from when the first threshold T1 is passed.

Despite the pump being put into operation, the liquid temperature continues to rise and reaches the second threshold T2 set to 95° C. at time 10 seconds.

This temperature rise while the pump is in operation is related to the fact that the ratio R of the heating power expressed in watts divided by the given fixed flow of liquid generated by the pump is greater than 2000.

As soon as the second threshold T2 that is set to 95° C. is detected, the electronic control unit 5 switches off the power supply to the heating resistance 12.

From time 10 seconds at which this cutoff occurs until time 11 seconds, the temperature continues to rise until reaching a peak of 105° C. at time 11 seconds.

Beyond this time 11 seconds, the liquid temperature drops to about 89° C. that is the third threshold T3, at time 13 seconds. This threshold T3 is preferably calculated by subtracting a temperature delta value from the second threshold T2. Thus, the third threshold T3 is always slightly lower than the second threshold T2, and in the example shown, this temperature delta is 1° C. This delta may be between 1° C. and 10° C. The temperature delta is chosen to be as small as possible because the variation of the water temperature at the outlet from the heating device will be lower when this delta is lower. Ideally, the water temperature at the outlet from the device should tend towards a constant.

Starting from T3, the control unit then re-powers the electrical resistance 12 as can be seen on the heating power curve P that changes from 0 to 2600 watts at time 13 seconds.

The liquid temperature continues to decrease due to the thermal inertia and then rises quickly after dropping to a minimum temperature of 62° C. up to a temperature close to 90° C.

The heating cycle using the method according to the invention is then interrupted at time 28 seconds when the control unit cuts off the power supply to the heating resistance and to the pump simultaneously.

Alternately, the heating cycle could have been extended without stopping the pump just by continuing to measure the variation of the liquid temperature and supplying power to the resistance when the temperature drops below T3 and switching this power supply off when the liquid temperature increases above T2.

One possible option in the control method for the device could consist of making a liquid circulate in said heating device 1 at a minimum flow Dmin less than the nominal flow D, before the liquid temperature T has reached the first temperature threshold T1.

With this characteristic, a small quantity of liquid that is not yet warm enough (less than T1) can be circulated as soon as the user switches the control on, thus giving him the impression that the device is available immediately. In any case, the liquid temperature will be higher than the threshold T1 within 3 seconds after the user inputs his control.

A choice will be made depending on the options according to the invention:
  the first temperature threshold T1 between 50° C. and 70° C., and preferably 55° C.;
  the second temperature threshold T2 between 80° C. and 100° C., and preferably 90° C.;
  the third temperature threshold T3 less than T2 by a delta temperature value between 1 and 10° C. and preferably 1° C.

The invention claimed is:

1. A method for preparation of a drink by supplying hot water through a liquid transport circuit (2) comprising:
a heating element (8) provided with a heating resistance (12);
a pump (14) arranged in series with the heating element (8) and adapted to circulate the liquid in the circuit (2);
the method further comprising after a user actuates a control means (7):
the liquid is heated by supplying a predefined average electrical power to the heating resistance, and a temperature (T) of the heated liquid is measured;
the liquid is kept heated;
and when the measured temperature (T) is greater than a first predetermined temperature threshold (T1), the liquid for the drink is circulated in said heating element (8) with a given constant nominal flow (D), characterised in that said given constant nominal flow (D) is less than 2 cl/second, when the average electrical power of the heating resistance (12) is a ratio (R) that is the average electrical power expressed in Watts divided by the constant nominal flow expressed in centiliters per second, where in the ratio is more than 2000.

2. The method according to claim 1, characterised in that said given constant nominal flow (D) is between 0.5 and 1.5 cl/seconds.

3. The method according to claim 2, characterised in that the ratio (R) between said predefined average electrical power and the given constant nominal flow is equal to a constant predefined value between 2000 and 4000.

4. The method according to claim 3, characterised in that the heating resistance power supply is switched off as soon as the measured temperature (T) is greater than a second threshold (T2), while maintaining the liquid circulation, and the fluid circulation is cut off when the required quantity of liquid has been supplied to the user.

5. The method according to claim 4, characterised in that after the power supply to the heating resistance (12) is switched off while maintaining liquid circulation, the heating resistance (12) is switched on again as soon as the measured temperature (T) passes below a third temperature threshold (T3) lower than the second threshold (T2) and higher than the first threshold (T1), and the cycle in which the power supply to the heating resistance is switched off and on begins once again until the user has been provided with the required quantity of liquid, depending on the case.

6. The method according to claim 5, characterised in that before the liquid temperature (T) has reached the first temperature threshold (T1), the liquid for the drink is circulated in said heating device (1) at a low minimum flow (Dmin) lower than the nominal flow D.

7. The method according to claim 6, characterised in that the first temperature threshold (T1) is between 50° C. and 70° C., and is preferably 55° C.

8. The method according to claim 7, characterised in that the second temperature threshold (T2) is between 80° C. and 100° C., and is preferably 90° C.

9. The method according to claim 8, characterised in that the third temperature threshold T3 is less than the second threshold (T2) by a delta temperature value between 1 and 10° C. and preferably 1° C.

10. The method according to claim 9, characterised in that the pump (14) and the heating element (8) are controlled independently of each other by an electronic control unit (5) provided with an electrical power supply source and a control means (7), the method being triggered by a single initial control exerted by the user on the control means (7), and the electronic control unit manages all actions included in the method when this control is received.

11. A drink preparation device (1) by for the supply of hot water, comprising:
a liquid transport circuit (2);
an electronic control unit (5) provided with an electrical power supply source and a control means (7) for the device;
the transport circuit (2) comprising:
a liquid heating element (8) including a heating resistance (12), the heating element being arranged in series with a pump (14) adapted to circulate liquid in the circuit (2) at a given flow (D), the pump (14) and the heating element (8) being electrically powered and controlled independently of each other by the control unit (5);
characterised in that the pump and the heating element have a ratio (R) that is the average electrical power (P) of the heating resistance (12) expressed in Watts, divided by the liquid nominal flow (D) that can be output by the pump (14) of the transport circuit (2) and expressed in centiliters per second, wherein the ratio is more than 2000.

12. The method according to claim 11, characterised in that the average electrical power of the heating resistance (12) is less than 3500 Watts.

13. The device (1) according to claim 12, characterised in that the heating element (8) and the pump are sized such that the ratio (R) is between 2000 and 4000.

14. The device (1) according to claim 13, characterised in that the heating element comprises a main body (9) associated with a complementary element (10) covering one face of the main body (9) to define a liquid circulation volume, said complementary element (10) having a silk-screen printed heating resistance (12) on its face (13) opposite the face facing the main body (9).

15. The device (1) according to claim 14, characterised in that the heating resistance (12) is digitally controlled by the control unit (5).

16. The device (1) according to claim 15, characterised in that it comprises a temperature sensor (C) connected to the control unit (5) and arranged to pick up a temperature (I) on a portion of the circuit located between the heating element (8) and a free end (4) of the liquid transport circuit (2).

17. The device (1) according to claim 16, characterised in that the temperature sensor (C) is a thermistor with a Negative Temperature Coefficient (NTC).

18. The device (1) according to claim 16, characterised in that the transport circuit (2) includes a liquid reservoir (15) connected in series to the pump (14) through a supply end of circuit (3) and supplying the circuit (2) with liquid to be heated.

19. The device (1) according to claim 18, characterised in that said reservoir (15) is removable and is provided with a closing valve (16) automatically opening a fluid path (17) from the reservoir (15) to the pump (14) when the reservoir (15) is connected to the supply end (3) and automatically closing off this path (17) when the reservoir (15) is disconnected from the supply end (3).

20. The device (1) according to claim 19, characterised in that the thermal inertia of the main body is less than the thermal inertia of aluminium.

21. The device (1) according to claim 20, characterised in that the complementary element (10) is made from a metal material with a coefficient (Cth) of transverse thermal conduction greater than 40.

22. The device (1) according to claim 21, characterised in that the main body (9) includes a groove so that it can define a liquid circulation channel (4) with the complementary element (10).

23. The device (1) according to claim 22, characterised in that the main body (1) is flat and in that the groove is spiral in shape.

24. The device (1) according to claim 21, characterised in that the main body (9) is cylindrical, and the complementary element (10) forming a sleeve fits on its outside face.

25. The device according claim 24, characterised in that the average electrical power of the heating resistance (12) is less than 3500 Watts.

\* \* \* \* \*